(12) United States Patent
Preciado et al.

(10) Patent No.: US 12,462,452 B2
(45) Date of Patent: Nov. 4, 2025

(54) POSITIONING FEEDBACK FOR DEVICE-TO-DEVICE COMMUNICATIONS

(71) Applicant: PassiveLogic, Inc., Salt Lake City, UT (US)

(72) Inventors: Marciano Carter Preciado, Salt Lake City, UT (US); Greg Hughes, Orem, UT (US)

(73) Assignee: PassiveLogic, Inc., Holladay, UT (US)

( * ) Notice: Subject to any disclaimer, the term of this patent is extended or adjusted under 35 U.S.C. 154(b) by 209 days.

(21) Appl. No.: 18/222,982

(22) Filed: Jul. 17, 2023

(65) Prior Publication Data

US 2025/0029296 A1 Jan. 23, 2025

(51) Int. Cl.
*G06T 11/40* (2006.01)
*H04M 1/72466* (2021.01)
*H04W 64/00* (2009.01)

(52) U.S. Cl.
CPC ......... *G06T 11/40* (2013.01); *H04M 1/72466* (2021.01); *H04W 64/00* (2013.01)

(58) Field of Classification Search
CPC ....... G06T 11/40; G06T 19/006; G09G 5/377; G09G 2340/12; G06F 2111/18
See application file for complete search history.

(56) References Cited

U.S. PATENT DOCUMENTS

2021/0083992 A1* 3/2021 Didear ................. H04L 67/75

* cited by examiner

*Primary Examiner* — Antonio A Caschera

(57) ABSTRACT

Displaying, on a screen of a mobile device having a camera, a real-time image from the camera; displaying, on the screen, feedback indicating positioning of a second device captured in the real-time image; determining that the positioning of the mobile device relative to the second device is sufficient to trigger an action on the second device; and triggering the action on the second device using the mobile device.

20 Claims, 12 Drawing Sheets

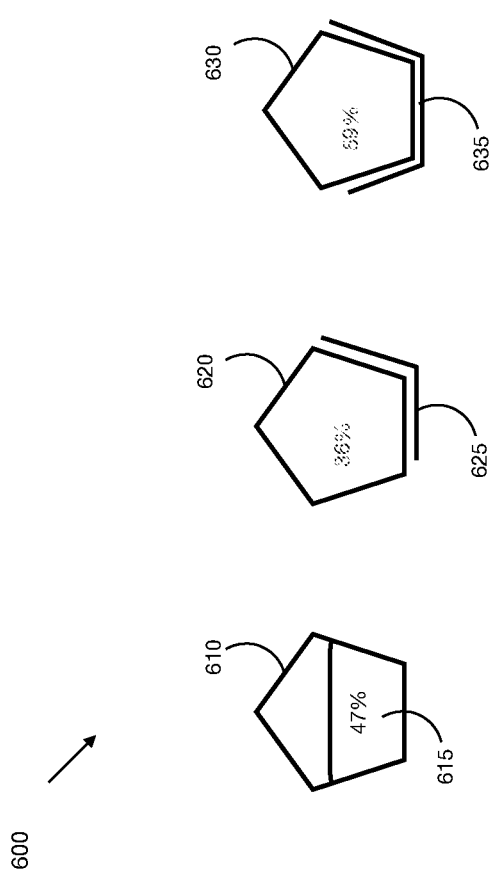

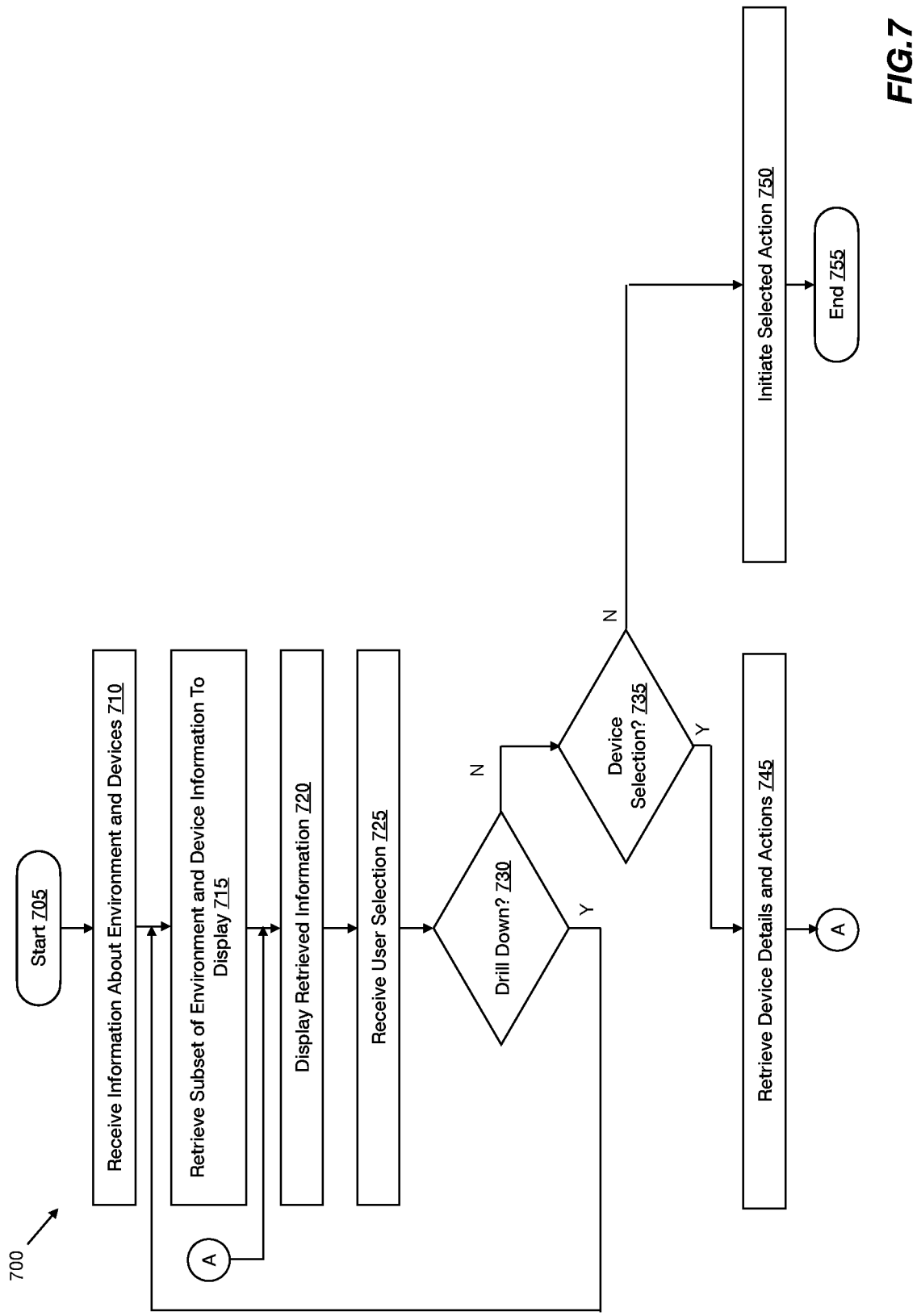

POSITIONING FEEDBACK FOR DEVICE-TO-DEVICE COMMUNICATIONS

RELATED APPLICATIONS

The present application hereby incorporates by reference the entirety of U.S. patent application Ser. No. 17/469,671, filed 8 Sep. 2021; and also hereby incorporates by reference the entirety of U.S. patent application Ser. No. 17/469,760, filed 8 Sep. 2021.

TECHNICAL FIELD

Various embodiments described herein relate to device communications and, more specifically but not exclusively, to feedback concerning positioning of devices to support such communications.

SUMMARY

This summary is provided to introduce a selection of concepts in a simplified form that are further described below in the Detailed Description section. This summary does not identify required or essential features of the claimed subject matter.

In various embodiments described herein, a method is disclosed, which includes: displaying, on a screen of a mobile device having a camera, a real-time image from the camera; displaying, on the screen, feedback indicating positioning of a second device captured in the real-time image; determining that the positioning of the mobile device relative to the second device is sufficient to trigger an action on the second device; and triggering the action on the second device using the mobile device.

In various embodiments described herein, during performance of the action, feedback of the second device is continued to be displayed based on the real-time image.

In various embodiments described herein, during performance of the action, a visual demonstration of the action is indicated on the screen.

In various embodiments described herein, determining when an understandable response to the second device by the first device can be achieved.

In various embodiments described herein, the understandable response includes a predefined pinging response strength, a predefined signal to noise ratio strength, or a predefined image exactness measure.

In various embodiments described herein, the predefined image exactness measure includes a determined difference between the real-time image of an outer perimeter of a second shape on the second device and an overlay of the second shape on the screen of the mobile device.

In various embodiments described herein, the visual demonstration of the action includes filling in the overlay of the second shape.

In various embodiments described herein, filling in the overlay of the second shape further includes filling in a percent of the action that has been completed.

In various embodiments described herein, indicating further includes displaying a wait cursor.

In various embodiments described herein, the action is a commissioning action.

In various embodiments described herein, commissioning action includes a light source on the mobile device sending an encoded message to the second device.

In various embodiments described herein, the feedback includes a real-time view of a second shape on the second device superimposed over an overlay of a first shape on the screen.

In various embodiments described herein, the first shape is a scaled version of the second shape.

In various embodiments described herein, a mobile device is disclosed, including a camera; a memory; and a processor configured to: display, on a screen of a mobile device having a camera, a real-time image from the camera; display on the screen, feedback indicating positioning of a second device captured in the real-time image; determine that the positioning of the mobile device relative to the second device is sufficient to trigger an action on the second device; and responsive to determining that the positioning is sufficient to trigger an action on the second device, trigger the action on the second device using a signal from the mobile device.

In various embodiments described herein, feedback indicating positioning of a second device captured in the real-time image includes an indication to a user that the action can begin.

In various embodiments described herein, the processor is further configured to trigger the action on the second device using the mobile device when the user indicates the action should begin using a user interface on the mobile device.

In various embodiments described herein, the signal from the mobile device is a sound signal, a radio signal, a LiDAR signal, or a light signal.

In various embodiments described herein, the signal from the mobile device includes an encoded signal.

In various embodiments described herein, the encoded signal includes a modified Morse code signal.

BRIEF DESCRIPTION OF THE FIGURES

In order to better understand various example embodiments, reference is made to the accompanying drawings, wherein:

FIG. 6 illustrates examples of progress feedback;

FIG. 7 illustrates an example method for enabling a user to initiate performance of an action with respect to a target device;

DETAILED DESCRIPTION

Figure 1:
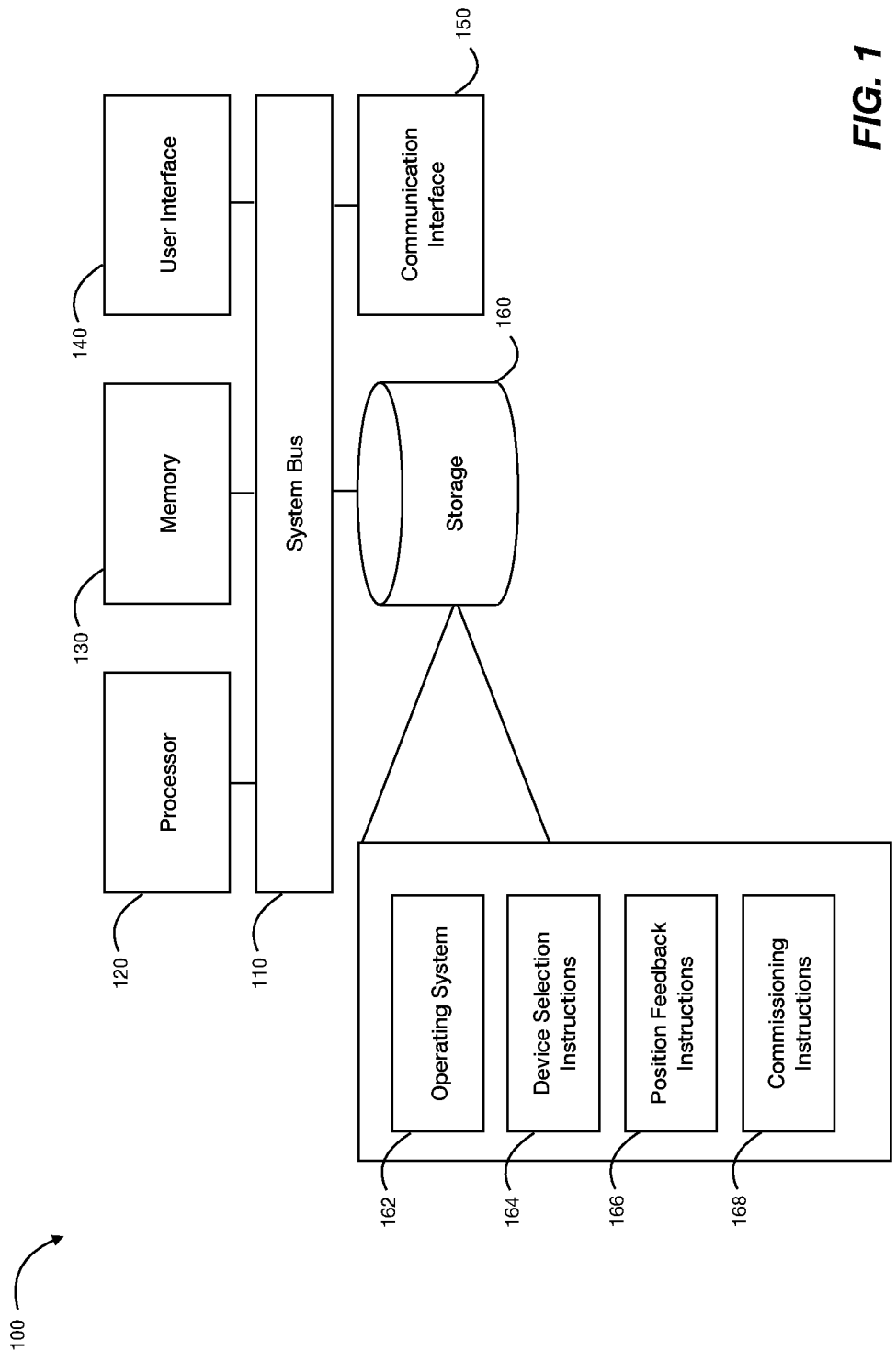
FIG. 1 illustrates an example hardware diagram for implementing a user device.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as use herein, refers to a non-exclusive "or" (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

While many communication protocols and media enable devices that are relatively far apart from each other to communicate, there still exist forms for device communication that either require or benefit from proper positioning, such as bringing the devices within a certain distances from each other or holding the devices at a particular orientation to each other. These forms of communication may include, for example, near field communication (NFC), Bluetooth low energy (BLE), Zigbee, or communication using light (e.g., from a flashlight of a phone) or audio (e.g., from a speaker of a phone) signals.

In some contexts, it is desirable to employ such short-range communications instead of more robust and long range approaches. For example in a system where a mobile device is used to initially activate and register each of a number of similar devices in an area, the fact that the mobile device must be near the intended device for communication to occur helps to ensure that the intended device is being communicated with rather than one of the other devices that happen to be in range.

When the devices need to be in a particular position to enable communication, however, this increases the likelihood of user error. For example, the user intending to initiate the communication may hold their phone slightly too far away or slightly too close to the other device without realizing it. This may lead to a frustrating experience in initiating these communications, especially if the user intends to initiate similar communications with each of a number of devices in an area.

Accordingly, various methods are described herein for providing feedback to a user to help ensure desired positioning of a device relative to another for purposes of short range communication or for other purposes. According to some embodiments, the user device displays a live image of the target device using its camera and overlays a positioning guide over the image. In some such embodiments, the positioning guide matches the shape of an indicia on the target device, and is displayed at a scale selected to ensure that, if the user brings their user device close enough to the target device to make the overlay match the size of the indicia as captured by the camera, the user device will be in the desired range for the communication. In this way, intuitive feedback is provided for even an unsophisticated used to fulfill the constraints of the desired short-range communication. Additional benefits will be apparent in view of the following description.

FIG. 1 illustrates an example hardware diagram 100 for implementing a user device, such as a cellular phone, tablet, other mobile device, or any user device capable of being moved for short range communication with each of a number of target devices. As shown, the device 100 includes a processor 120, memory 130, user interface 140, communication interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, field programmable gate array (FPGA), application-specific integrated circuit (ASIC), a vector processor, or any other device capable of performing the logic functions described herein. In a multi-processing system, multiple processing units execute machine-executable instructions to increase processing power and as such multiple processors, as well as multiple elements with a processor, can be running simultaneously. It should be apparent, however, that in various embodiments elements belonging to the processor 120 may not be physically co-resident. For example, multiple processors may be attached to boards that are physically separate from each other.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 140 may include one or more devices for enabling communication with a user such as a technician installing or commissioning target devices. For example, the user interface 140 may include a display and a keyboard for receiving user commands. The user interface 140 may also include a mouse. In some embodiments, such as some embodiments where the device 100 is a mobile device, the user interface may include buttons or a touchscreen interface. In some embodiments, the user interface 140 may include a command line interface or graphical user interface that may be presented to a remote terminal via the communication interface 150. Voice User Interfaces, which allow users to interact with systems using spoken commands, Augmented Reality Interfaces (sometimes referred to as Virtual Reality Interfaces, which overlay virtual elements onto a real-world environment, Gesture Based Interfaces which allow users to control computerized objects, devices, systems, etc., based on gestures, may also be used as user interfaces.

The communication interface 150 may include one or more devices for enabling communication with other hardware devices. For example, the communication interface 150 may include a network interface card (NIC) configured to communicate according to the Ethernet protocol. The communication interface 150 may include a bluetooth transmitter, receiver, antenna and specialized control chips. Additionally, the communication interface 150 may implement a TCP/IP stack for communication according to the TCP/IP protocols. The communication interface may also include various alternative or additional hardware or configurations for the communication interface 150 as will be apparent.

In some embodiments, the communication interface 150 includes hardware or firmware for short range communication with target devices. For example, the communication interface 150 may include a flashlight and firmware for transmitting a an encoded message by controlling the flashlight to emit flashes of light convey the encoded message (e.g., using Morse code or a modification thereof). As another example, the communication interface 150 may include a speaker (e.g., a speaker that is also part of the user interface 140) and firmware for transmitting an encoded message by emitting an acoustic signal via the speaker. Various other hardware and firmware for short-range communication will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 162 for controlling various basic operations of the device 100. The storage 160 may also include device selection instructions 164 for enabling a user to select a target device to be commissioned; position feedback instructions 166 for guiding a user to properly position the device 100 for commissioning to be performed with respect to the selected target device; and commissioning instructions 168 for causing the commissioning to occur once the device 100 is properly commissioned. Example methods for implementing the device selection instructions 164, position feedback instructions 166, and commissioning instructions 168 will be described in greater detail below with respect to FIGS. 7-9, respectively. As used herein, the term "commissioning" will be understood to encompass a wide range of operations that may be performed or triggered by the device 100 on one or more target devices. For example, commissioning may include powering on a target device; waking a target device from a sleep state; installing software, firmware, or an update thereto on the target device; modifying a configuration of the target device; reading sensed or other gathered data from the target device; controlling or causing the target device to perform an action; testing or validating the operation of the target device; verifying the location of the target device is as expected; or causing the target device to initiate communication with one or more other devices (e.g. a controller) to effect one or more of the preceding.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the hardware device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server. This may be the case, for example, where the operations of the user device 100 are directed, at least in part, by a software-as-a-service application running in the cloud or on another remote server.

Figure 2:
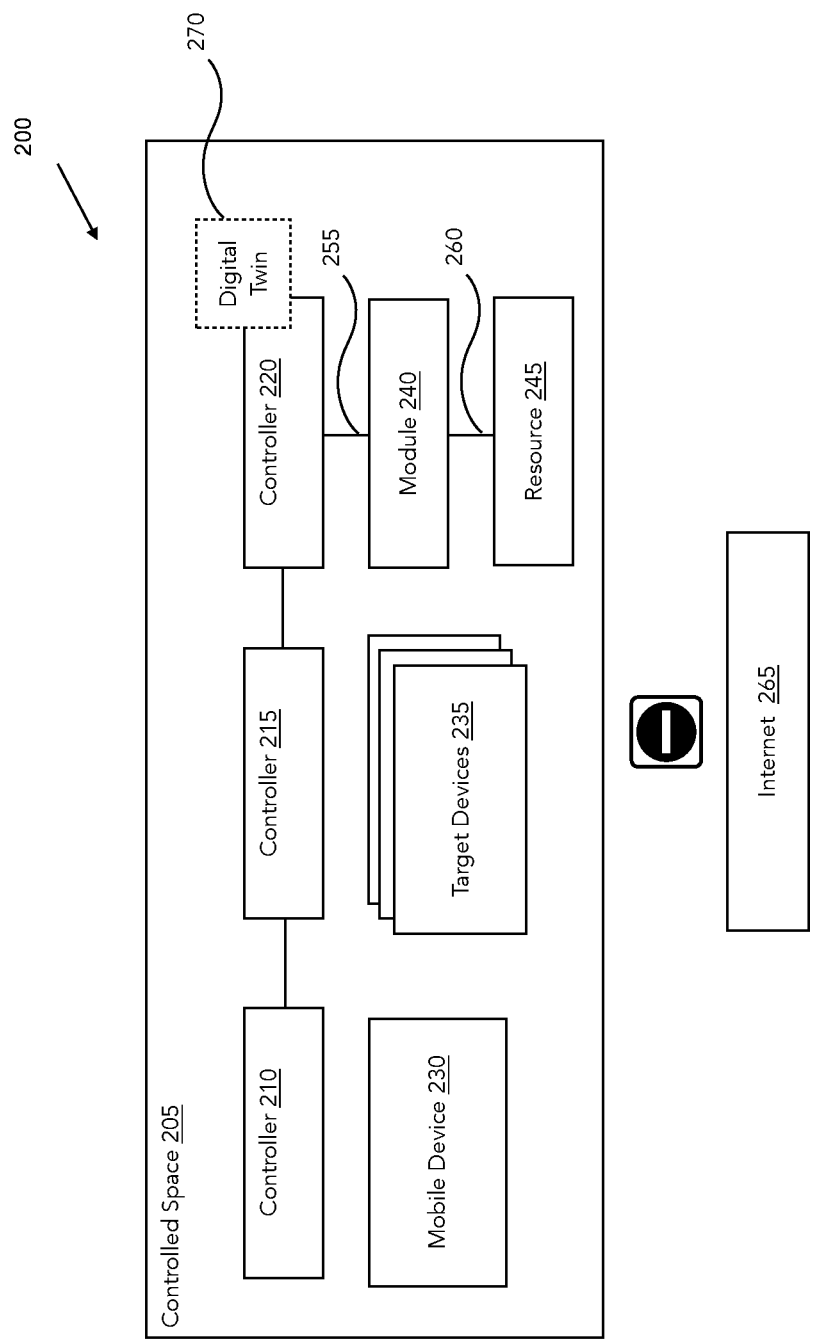
FIG. 2 illustrates an example environment for deployment of various embodiments.

FIG. 2 illustrates an example of an environment 200 where various embodiments may be utilized. The environment 200 may include a distributed computing system (e.g., implemented among multiple controller devices 210, 215, 220), which may be a network of interconnected computers that work together to solve complex computational problems or process large amounts of data. In a distributed computing system, each computer, controller, or node (such as a sensor), may be responsible for performing a portion of the overall computation or data processing task. These controllers, nodes, etc., which may be sensors communicate with each other through a communication network, exchanging data and coordinating their activities. In some embodiments, the distributed computing system may be designed to allow multiple computers to work together as if they were a single system. This may be achieved through the use of specialized software that manages the distribution of tasks among the nodes and coordinates their activities. The software also provides mechanisms for error detection and fault tolerance, ensuring that the system can continue to operate even if one or more nodes fail. In embodiments, the workload is divided into smaller, manageable parts and distributed among the participating controllers/nodes, etc. Each controller/node may processes its assigned part of the workload and then communicate the result back to a central coordinating controller/node or a group of controllers/nodes. This process may be done completely internally, without use of external source, such as without Internet, or may be performed with outside network resources, such as cloud resources. The "smaller, manageable parts" in a distributed computing system may refer to tasks or sub-problems that can be divided and assigned to individual controllers/nodes within the system. These parts are may be designed in a way that enables them to be processed independently without requiring coordination with other controllers/nodes. The specific nature of the smaller parts will depend on the particular task or problem being addressed by the distributed computing system.

The environment 200 may include controlled space 205 wherein a collection of controllers and other devices cooperate to control some aspect of the space. For example, the controlled space 205 may represent a building where the heating, ventilation, and cooling (HVAC) is to be controlled. Alternatively, the controlled space 205 may be a building where lighting is to be controlled; a farm where irrigation is to be controlled; a factory where an manufacturing process is to be controlled; or a power plant where power generation and distribution is to be controlled. As will be apparent, the methods described herein may be used in virtually any environment.

In the illustrated embodiment, the controlled space may have multiple controllers (e.g., 210, 215, 220) within the space. In some embodiments, the distributed computing system may run without access to the Internet 265. In some embodiments, the distributed computing system may be run as an edge computing system with one or more edge devices that allow selective connections to the Internet through them. In some embodiments, the distributed computing system allows applications (e.g., software) to run on multiple controllers (e.g., some combination of 210, 215, 220) simultaneously or serially, or a combination of both. The same application may run in concurrent processes on different processors, on different controllers, etc., such that users perceive the controllers as an integrated whole. This may provide redundancy, as when components fail, other components can seamlessly take over their roles. These distributed applications may be stored and run completely within the controlled space 205 without access to external Internet 265. This may allow low latency, as. e.g., processing time is not affected by cloud/Internet lag time. In some instances, one or more controllers 210, 215, 220 may connect to the Internet 265. The connection may be siloed off from the bulk of the computing power in the controlled space 205.

The distributed computing system may run as a client-server system with one controller being designated as the master-server. The distributed system may be run as a peer-to-peer network, a virtual server may be used, etc. The controllers may be self-federating; e.g., they self-assemble into a network. Controllers may vote to elect a leader. If the network is damaged, such that the current leader can no longer lead, a new leader may be elected by at least some of the undamaged controllers. This provides built-in redundancy. The leader controller may determine how to divide the work load among the controllers. A mobile device 230 (described in greater detail with reference to FIG. 10) may also be included. This mobile device may be used to give feedback, receive feedback, trigger a program, etc.

The controller may connect wirelessly to one or more resources/target devices 235. The controller may have connectors that connect to module 240 through module connectors 255. The module may have resource connectors 260, that are directly wired to a resource 245. The target devices/resources 235, 245 may be any sort of resource, without limitation, that can be wired or otherwise hooked up to to a controller, through, for example, a wireless link. For example, without limitation, resources may be HVAC resources, such as heating, cooling, and storing resources, entertainment resources, such as sound systems and TV's, lighting resources, safety resources, such as door locks, temperature and other sorts of sensors etc. Some of these resources may require programs to be run on them such as configuration, software patches, updates, tests, etc. One or more of these programs may be installed when certain conditions are met. Those certain conditions may be indicated by feedback. The controller 220 may control a resource 245 though the resource connectors 260 communicating to the module connectors 255, and vice-versa.

It will be understood that, while in the example of environment 200, the target devices 235 may be in wireless communication with one or more controllers 210, 215, 220, in various other embodiments, one or more target devices 235 may be in wired communication with a controller 210, 215, 220, for example, directly or via one or more modules 240. In some embodiments, one or more resources 245 may also be target devices 235. Further, in some alternative embodiments, one or more of the controllers 210, 215, 220, modules 240, or resources 245 may not be present or additional devices taking on different roles (not shown) may be included. In some such embodiments, the controlled space may simply include the mobile device 230 and one or more target devices 235. In some such embodiments, those two types of devices may form an entire system for the deployment of the methods described herein. In other such embodiments, one or more devices accessible via the Internet 265 or other network may take on a role or perform functionality for the controlled space 205, e.g., by providing software updated, configuration updates, control commands, etc. to the mobile device 230 or target devices 235 upon commissioning.

In certain embodiments, a controller may not control a specific resource but infers its state from scanners, sensors, the state of other resources, and so forth. These resources may provide feedback, or feedback may be used to indicate when such resources may be accessed. In some embodiments, the controllers, e.g., 210, 215, 220 run without use of the Internet 265. This allows for a much more secure system, as the system 200 should be impervious to Internet attacks, such as DDOS attacks, zero day exploits, etc. When running without the Internet, messages may be sent directly from mobile devices, with such devices incorporating feedback into the messaging system.

It will be apparent the system illustrated in the environment 200 may be a simplification and that, in a real environment (e.g., for controlling the HVAC of a building), numerous additional resources 245 and target devices 235 may be included. For example, the resources 245 and target devices 235 may represent boilers, water tanks, heat exchangers, pumps, valves, chillers, fans, baffles, sensors, and numerous additional equipment. As such, fewer or additional controllers 210, 215, 220 may be included to control all of this equipment, additional modules 240 may be included to enable connection of additional equipment, and resources 245 and target devices 235 may be connected to additional or other controllers, such as controllers 210, 215.

According to various embodiments, one or more of the controllers 210, 215, 220 may store a digital twin 270 for use in controlling the system represented by the resources 245 and target devices 235. For example, the controllers 210, 215, 220 may leverage the digital twin to run simulations to test candidate control schemes before issuing control instructions to the target devices 235 or resources 245. As another example, the controllers 210, 215, 220 may use the digital twin 270 to determine where the devices should be located, both in physical space and on the network, such that the controllers are able to direct messages such as test messages appropriately and verify that the target devices 235 or resources 245 are located in the correct place and are functioning correctly.

In various embodiments, the digital twin 270 or location information extracted therefrom may be provided to the mobile device 230 for use in communicating with the target devices 235. For example, if the mobile device 230 is used for activating, commissioning, verifying, or testing the target devices 235, the mobile device can use its own location information along with the location information for the target devices 235 to determine which of the target devices 235 it is near. In some such embodiments, the use of short-range communication then ensures that the mobile device 230 is only able to communicate with the target device 235 to which it is nearest, thereby giving greater assurance of the identity of the target device 235—i.e., the mobile device 230 is communicating with a target device 235 at position A, so the target device 235 is likely to be the target device identified at or near position A in the digital twin 270. The mobile device 230 may then proceed to establish communication for commissioning, testing, verification, etc.

Figure 3B:
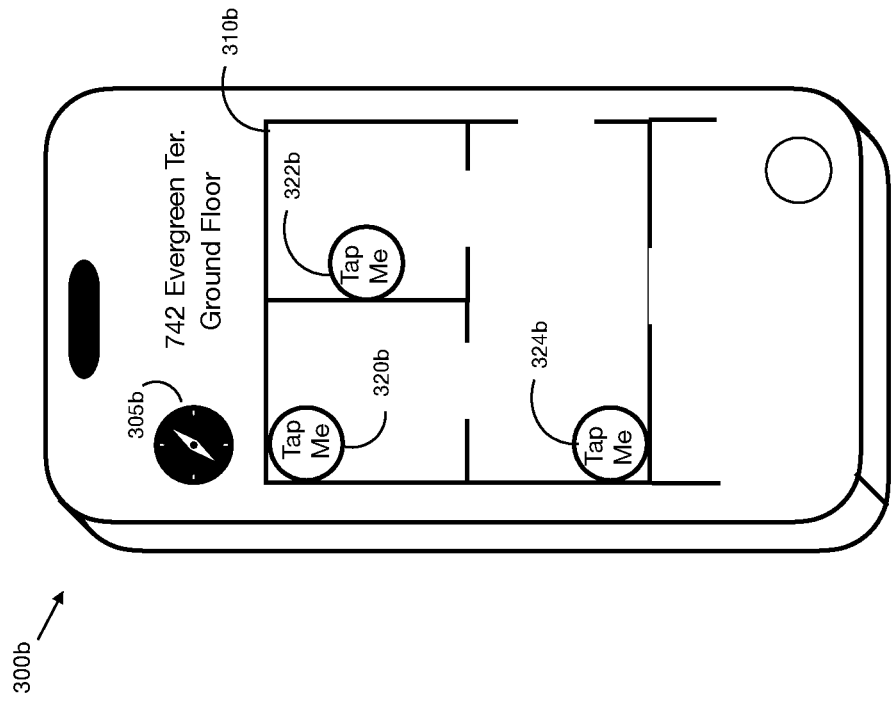
FIG. 3B illustrates a second example interface that may be used initiate short range communications or other actions with target devices.
Figure 3A:
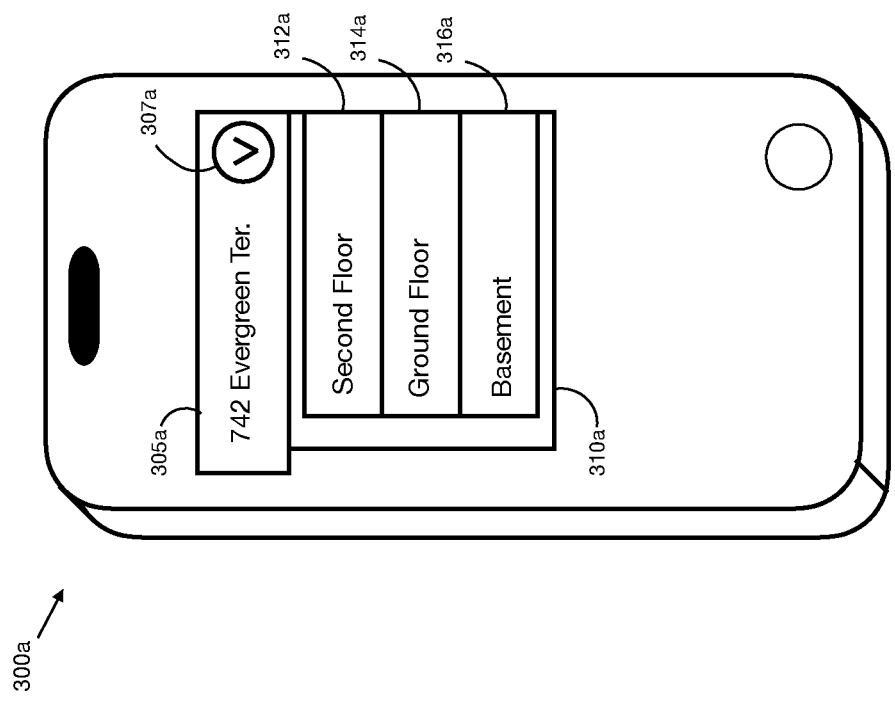
FIG. 3A illustrates a first example interface that may be used initiate short range communications or other actions with target devices.
Figure 3C:
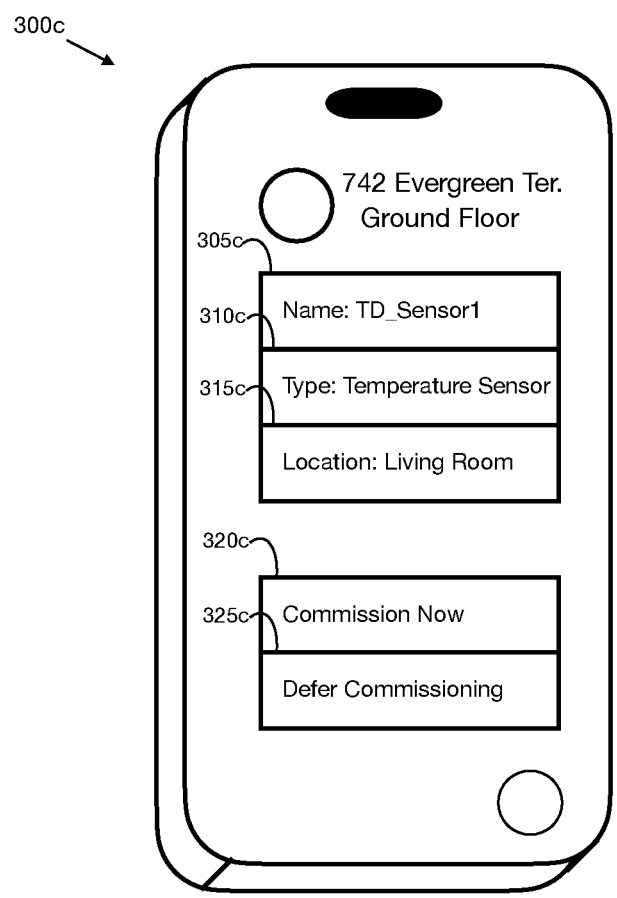
FIG. 3C illustrates a third example interface that may be used initiate short range communications or other actions with target devices.

FIGS. 3A-3C illustrate examples of interfaces 300a, 300b, 300c that may be used to initiate short-range communication with various target devices. These interfaces 300a-c may be displayed on the mobile device 230 (or other appropriate user device). In some embodiments, the mobile device 230 has access to information within the digital twin 270 or information extracted therefrom such as a floorplan along with identities and locations of target devices indicated by the digital twin as installed in the environment. This information bay be provided, for example, by one of the controllers 210, 215, 220 or by another source, such as a software service accessible via the Internet.

In some embodiments, equipment installed in a building, such as one or more of the target devices 235, may have reason to communicate with the mobile device 230. For example, the mobile device may provide need software updates, such as an initial configuration or a lifetime software update, to the target devices 235. This update may be provided by an update tool running on the mobile device 230, and communication to effect such update may occur when the mobile device 230 is within some specific distance from the equipment. Various additional or alternative goals of this communication between the mobile device 230 and the target device 235 may be accomplished such as, for example, activating the target device 235 (e.g., switching a state from sleeping/off to operational/on), verifying that the target device 235 is present at the expected location, validating that the target device 235 is operating correctly, performing one or more tests on the target device 235, triggering the target device 235 to send data or otherwise communicate with another device in the environment, providing other diagnostic insight, or any other goal. For the purposes of the present disclosures, the term "commissioning" will be understood to encompass all such possible goals related to activation, verification, and update of a target device 235.

In some such embodiments, the target device 235 may have previously been marked to exist within a digital twin 270. This marking may include the location of the equipment, the type of the equipment, a name of the specific piece of equipment, and the type of update that the equipment needs. When commissioning such a piece of equipment, it may be beneficial to locate the virtual twin of the target device 235 within the digital twin 270 or otherwise identify to the commissioning tool which target device 235 is being commissioned next. Interfaces 300a-c represent an example interface for allowing a user to navigate a representation of the digital twin and identify the intended target device 235 for commissioning. Interface 300a of FIG. 3A may represent a top level view of the digital twin. Here, where the digital twin represents a building along with its HVAC and sensing systems, the interface 300a allows the user to first select a floor of the building to begin drilling down to the specific target device 235 for commissioning. As shown, a building selector 305a may allow the user to select among multiple possible buildings (and corresponding digital twins) within that user's commissioning portfolio. Upon selecting the down arrow 307a, a list of multiple buildings may be shown and, upon selection of one of the buildings, the corresponding digital twin may be queried to produce a list of floors modeled for that building.

In the example of FIG. 3A, the building at 742 Evergreen Terrace has been selected. Below the building selector 305a is a floor list 310a that provides three floor selectors 312a, 314a, 316a, as informed by the digital twin for the selected building and representing the three floors of the real world building: the second floor, ground floor, and basement, respectively. Upon selection of one of the floor selectors, a new interface showing additional detail about the digital twin for the selected floor may be shown.

FIG. 3B illustrates an example interface 300b that may allow a user to choose a target device to be commissioned. This interface 300b may be displayed, for example, in response to a user selecting the ground floor selector 314a of the preceding interface 300a. Once the floor is chosen, a floorplan of the area 310b is displayed along with representations of one or more target devices 320b, 322b, 324b located on that part of the floor (as anticipated, for example, by the digital twin 270). The displayed target devices 320b, 322b, 324b may be simply all target devices indicated as located in the area, the target devices that need to be commissioned (e.g., those tagged as un-commissioned in the digital twin 270), or target devices selected based on some other criteria.

This map may include a compass 305b to help the user orient themselves, walls, and other features, as well as devices, e.g., 315b, that can be commissioned or otherwise selected. In some embodiments, the compass 305b may update its display based, for example, based on a bearing indicated by the operating system of the mobile device or based on feedback from one or more accelerometers of the mobile device. In some embodiments, the orientation of the floorplan 310b may be updated in a similar manner to ensure that the floorplan 310b matches the likely viewpoint of the user. In some embodiments, the location of the mobile device may also be represented on the floorplan. Various alternative or additional features for assisting a user in navigating a real space to locate target devices will be apparent.

The icons or other representations of the target devices 320b, 322b, 324b may have a marker (e.g., "Tap Me" respectively) indicating that the user can select the representation to enter another interface 300c detailing that specific target device. This marker may be a different color, text, a haptic signal may be triggered if one is touched, etc. A user may then indicate which device is to be updated, by, e.g., tapping, clicking, etc.

FIG. 3C illustrates an example of an interface 300c that may appear when a target device is chosen to show more detail about the selected device. In some implementations, the chosen device may be identified by name 305c, type 310c, location 315c, or any other pertinent identifying information. The interface 300c may also display one or more selectable elements 320c, 325c corresponding to actions that may, should, or are expected to be taken 310c. Upon selection of at least some of the selectable elements 320c, 325c, the mobile device may begin to perform the corresponding action. In some cases, the action may involve establishing short range communication with the target device. For these actions, the interface may proceed to display a new interface that provides feedback for positioning the mobile device relative to the target device to enable or optimize such short range communication, an example of which will be described below.

Figure 4B:
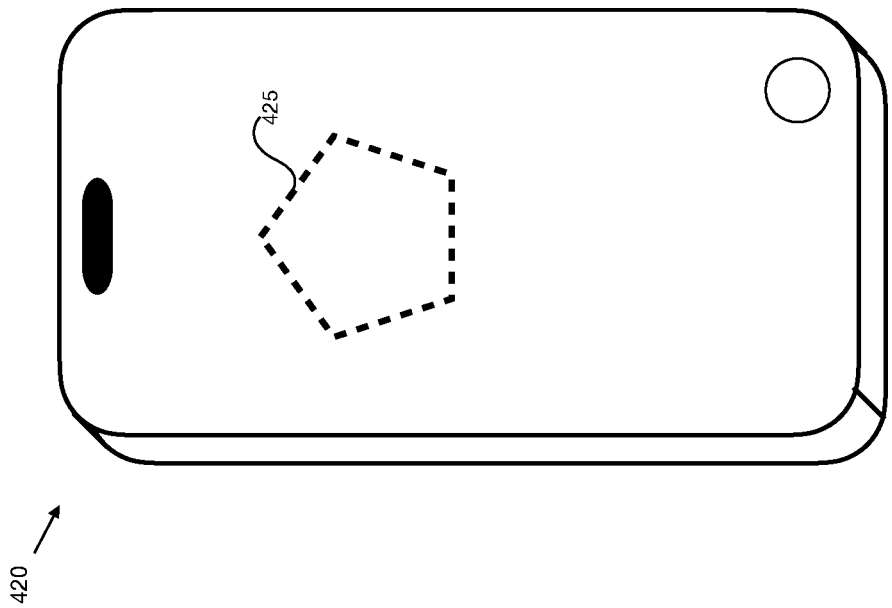
FIG. 4B illustrates a first example interface for providing positioning feedback to a user.
Figure 4A:
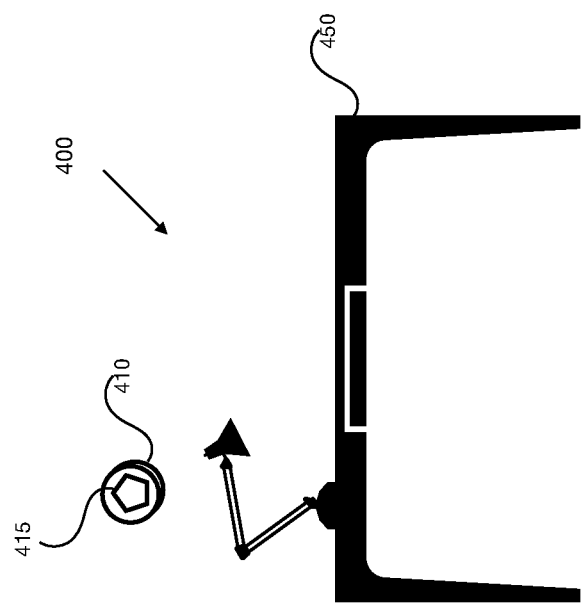
FIG. 4A illustrates an example environment for providing positioning feedback to a user.

FIG. 4A illustrates an example environment 400 where a target device 410 is installed. For example, the environment 400 may be a room, such as the living room on the ground floor of the building at 742 Evergreen Terrace. The room 400 and the target device 410a may be modeled by the digital twin 270. The room 400 may include additional items not modeled by the digital twin 270, such as furniture 450, shown as a desk and a lamp. The target device 410 has an indicia 420 that may be used in some implementations to help to provide feedback for indicating when a mobile device is correctly positioned with reference to the target device 405a. As shown, the indicia 420 is an image of a pentagon visible on the front face of the device 420. FIG. 5A illustrates a larger view of the target device 410, with the indicia 415 more prominently displayed. Though the indicia 415 in this embodiment is in the middle of the target device, the indicia 415 can be anywhere on the device. In the instant example, the indicia 415 is a pentagon, but can be any shape. The various embodiments, virtually any shape or other visible indicia may be used. Further, the indicia 415 may be printed on, affixed to, formed in (e.g., as a boss or a recess), displayed on a screen of, projected onto a surface of, or physically attached to the device 410 in any way. In some embodiments, the indicia 415 may be the profile or shape of the device 410 itself or a portion thereof (in the illustrated example, the circular shape of the target device 410 instead of or in addition to the pentagon 420).

Figure 5B:
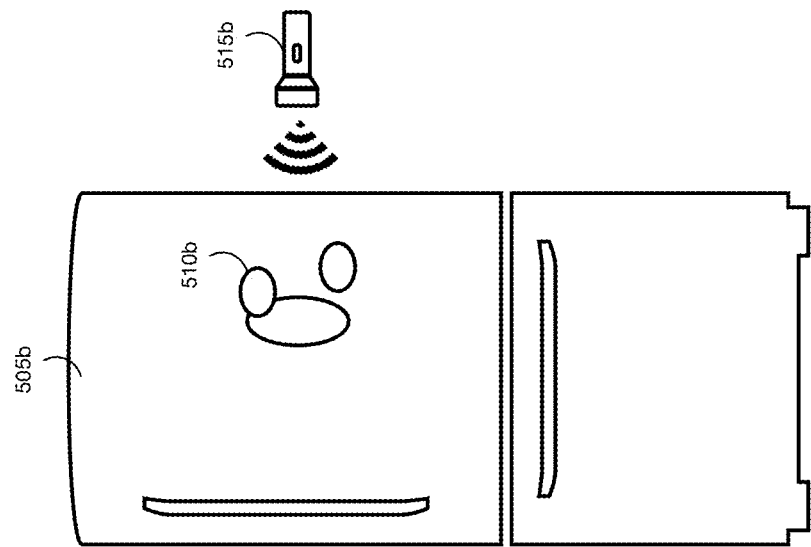
FIG. 5B illustrates a second example target device and positioning indicia.
Figure 5A:
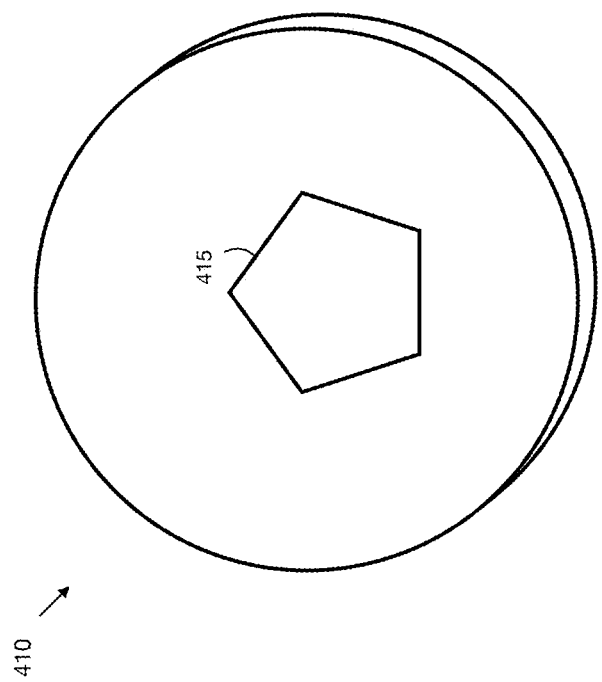
FIG. 5A illustrates a first example target device and positioning indicia.

FIG. 5B illustrates some other characteristics of potential indicia. The target device 505b (e.g., a refrigerator) has an indicia 510b that is invisible except when under certain light 515b, which renders the indicia visible 510b. For example, the indicia 510b may be formed of an ink or other material that fluoresces under a black light. As another alternative, the indicia 510b may be visible after the light 515b is turned off, such as in the case of "glow-in-the-dark" ink or material. The indicia 510b is also shown to include more than one part, in this example including three distinct ellipses. An indicia may also be a line, a raised or lowered section, etc.

FIG. 4B illustrates the screen of a mobile device 420 that will provide feedback for aiding a user in positioning the mobile device 420 relative to the target device 410. In this embodiment, the mobile device displays an overlay 425 on the screen that is the same shape as or otherwise matches the indicia 415 of the target device 410. The overlay 425 may be displayed when the mobile device 420 is in a mode where it expects or intends to initiate short range communication with the target device 410 or otherwise expects or intends to be positioned at some distance, range, or orientation relative to the target device 410. For example, the mobile device 420 may be placed in the communication mode and display the overlay 425 in response to selection of the "Commission Now" button 320C of interface 300c.

Other embodiments may have overlays that are of a different shape than the indicia 415 but that nonetheless match the indicia 415 in some way and are therefor useful to position the mobile device 420 appropriately. For example, the overlay 425 may be only a partially complete version of the indicia (e.g., only the bottom line of the 5 lines forming the pentagon indicia 415 or a complementary shape (e.g., a square to surround a pentagon, a star to be surrounded by a pentagon, a left half of a heart to align with a right half of a heart and form a full heart shape, a first word to be aligned with a second word, etc.).

When commissioning the target device 410, the camera of the mobile device 420 may be activated and capture an image of the surrounding area, which may then be reproduced on the display of the mobile device 420. For example, the camera may capture a one or more still images or a video of the area. The resulting display on the mobile device 420 may include a live reproduction of the captured image. As shown in FIG. 4C, when the camera of the mobile device 420 is pointed at the target device 410, the screen of the mobile device 420 may reproduce an image of the target device 412 along with an image of the indicia 417, as well images of other incidentally captured items such as furniture 452. The mobile device 420 continues to display the overlay 425 over the images 412, 417, 452 captured by the camera. In this way, various embodiments provide a form of augmented reality to help guide the user in commissioning the target device 410. In various embodiments, the size of the overlay 425 is fixed, while the size of the indicia image 417 is determined by how close the camera is to the real indicia 415. The fixed scale of the overlay 425 may thus be selected to match or otherwise be based on the intended distance between the mobile device 420 (and consequently its camera) and the target device 410 (and consequently its indicia 415) for short range communication to occur. This relative difference in scales may induce or instruct the user to move the mobile device 420 such that the overlay 425 is positioned to match the indicia image 417 in some fashion. In some embodiments, the overlay 425 may cover a percent of the indicia image 417. In some embodiments, the scale of the overlay 425 may be adjusted during operation. For example, if the initial intended distance proves to be not close enough (e.g., due to higher than expected medium noise or lower communication power in the target device 410), the mobile device 420 may increase the scale of the overlay 425 to direct the user to bring the mobile device 420 even closer to the target device. Various other user actions may be induced using the characteristics of the overlay 425. For example, if the overlay 425 is rotated relative to the indicia image 417, this may induce the user to rotate the mobile device 420 to make sure the overlay 425 and indicia image 417 are aligned. In some alternative embodiments, rather than an overlay 425, an audible tone is played from a speaker of the mobile device, which may get softer and louder, multiple tones, songs, etc. are used as feedback to indicate how close or how far apart the two devices 410, 420 are.

Figure 4D:
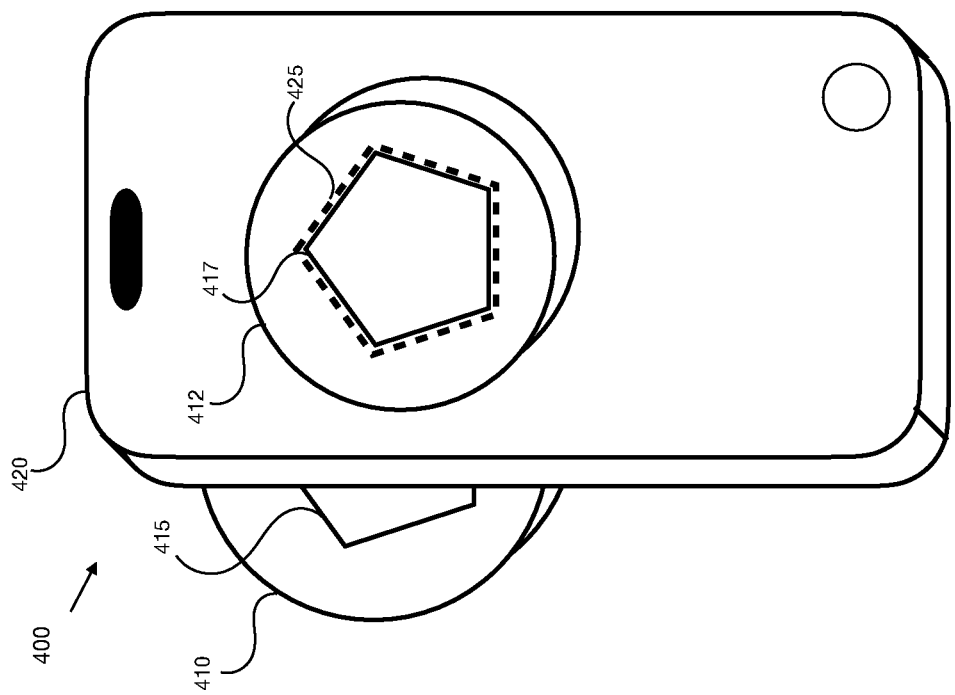
FIG. 4D illustrates the example environment and a third example interface for providing positioning feedback to a user.
Figure 4C:
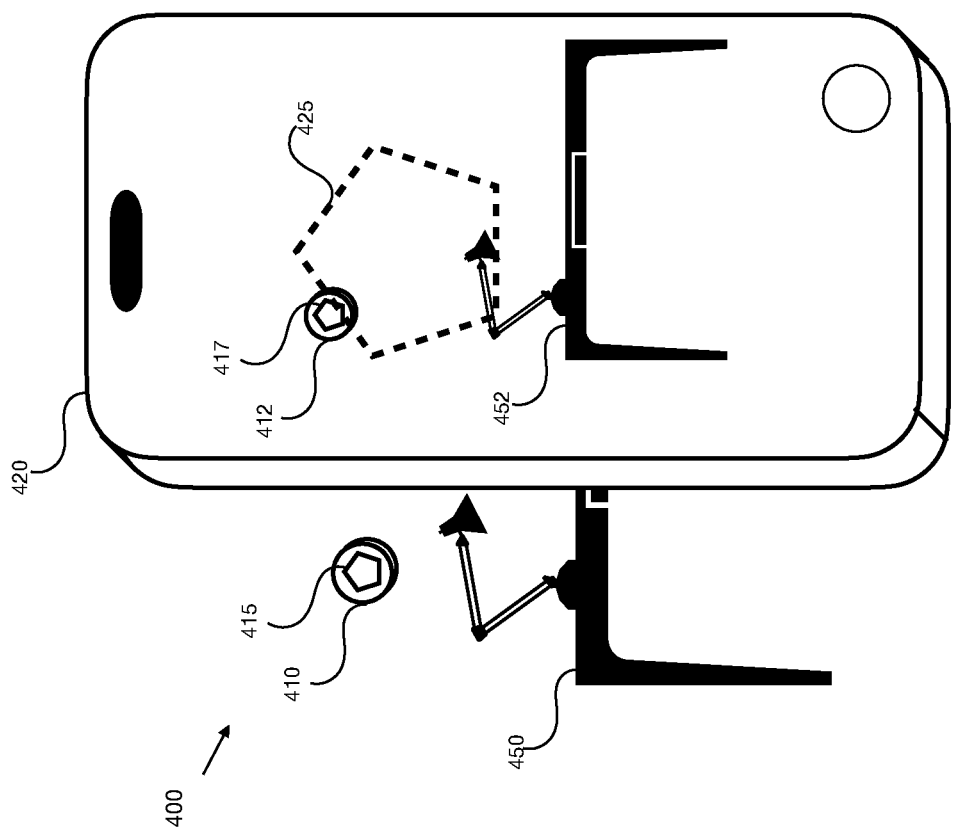
FIG. 4C illustrates the example environment and a second example interface for providing positioning feedback to a user.

As shown in the example of FIG. 4D, the mobile device 420 has been moved closer to the target device 410, such that the target device image 410 is larger and the indicia image 417 is the same or about the same size as the overlay 425. How close or precisely the overlay 420 must overlap the indicia image 417 may be usage dependent.

Figure 4F:
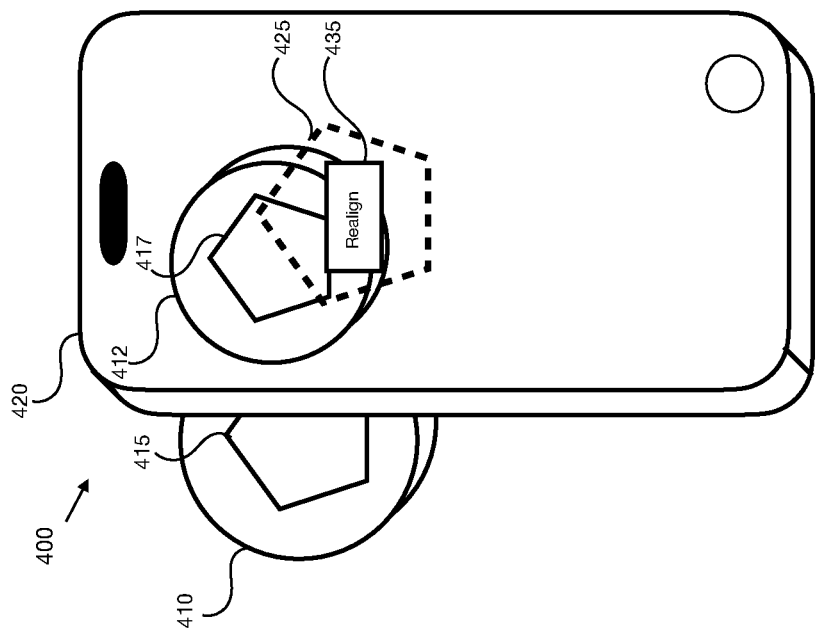
FIG. 4F illustrates the example environment and a fifth example interface for providing positioning feedback to a user.
Figure 4E:
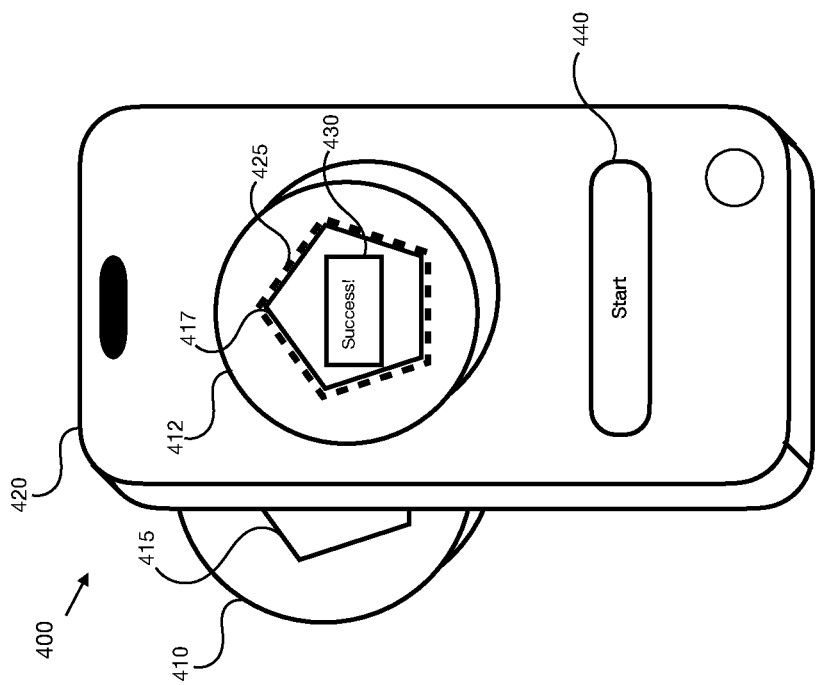
FIG. 4E illustrates the example environment and a fourth example interface for providing positioning feedback to a user.

FIG. 4E shows a display for the mobile device 420 when it has determined that short range communication is ready to begin. For example, the mobile device 420 may make such a determination by successfully completing a communication with the target device 410 (e.g., a PING and ACK exchange via the short range communication medium), by performing image analysis to determine that the overlay 425 and indicia image 417 are sufficiently aligned, or by other means for determining that the positioning of the mobile phone 420 relative to the device 410 is as intended. In some embodiments, the mobile device 420 may immediately display positive feedback after determining the devices 410, 420 are positioned as intended or may wait for a predetermined amount of time or for a threshold degree of stability in the devices 410,420 before giving such positive feedback.

As shown, the mobile device 420 is positioned correctly with reference to the target device 410. At or near this point positive feedback may be provided. This feedback may be from the mobile device. In some embodiments, the feedback could be on the target device 410 itself (lights could go on, flash, etc), on speakers in the space (they could play a tone, a short piece of music, etc.). Feedback may be provided on the mobile device 420. For example, haptic feedback may be provided on the mobile device, may be one or more sounds, may be a light flash, one or more colored lights, etc. In the illustrated example, text displaying "Success" 430 is displayed on the mobile device, or the overlay 420 may change color. In some embodiments, feedback is given for a period from when a target device 410 is spotted in the camera until the mobile device 420 is correctly located. For example a tone could get louder as the mobile device got closer, and softer as the mobile device got further away. In some embodiments, the feedback may be given for a portion of the positioning, such as from when the target device is a certain size, is at a certain distance away (as, for example, measured by LiDAR), etc. In embodiments, the feedback includes a real-time view of a device to be acted on superimposed over an overlay of a shape corresponding to a shape on the device. In embodiments, the overlay is a scaled version of the shape on the device, such as the pentagon shape 415 on the target device 410. This example overlay can be seen at 425.

Once the feedback indicating that the mobile device is correctly positioned, the action to be taken (which may be shown, e.g., with reference to FIG. 3C at 310c) is ready to happen. This action, in some implementations, may take place automatically. In some implementations, a signal may be given to a user to begin the action. For example, the mobile device 420 may display a button to be pushed (e.g., "Start" 440). In such a case, the action does not begin until there is a human interaction, such as pushing the Start button 440. In some embodiments, the appearance of the start button 440 or other request for user input may be the positive feedback itself.

In some embodiments, the relative position of the device 410, 420 may need to be maintained to at least some degree. Feedback may be given when the mobile device moves out of location during an ongoing operation such as short range communication; feedback may be given for the time the mobile device is in the correct location; feedback may differ depending on how close the object is to correct location, and so on. As shown in FIG. 4F, a mobile device 420 screen may give a visual warning when the mobile device is out of position. As shown, the mobile device 420 shows the misalignment between the overlay 425 and indicia image 417, and displays the word "Realign" 435. In some embodiments, something else may change, such as the color of the overlay 425, etc.

Various methods may be used to trigger a program or otherwise effectuate communication between the mobile device 420 and target device 410 after appropriate positioning has been achieved. In various embodiments where the target device 410 is part of a larger controlled system, with the various systems understanding where each other are, and what each other does, one portion of the system may trigger an action, with another portion of the system performing the action. In some embodiments, the mobile device 420 may trigger a target device 420 using a sound wave or using light. For example, an action may include a light source on the mobile device sending an encoded message to the target device. These triggering actions and the actions themselves may configure a device (e.g., initially, after an update, after an error), modify security on a device, initiate a secure wireless connection with a device, or otherwise commission a device. In such cases, the device may use an initial trigger to wake the device, to authenticate the device, to register the device to a network, etc. In some embodiments, the mobile device 420 initially triggers the device, then the device connects to the network by itself. As the mobile device 420 doing the triggering knows what the device is, the mobile device can communicate that information to the device itself. The device can use this information to further connect itself to the network. When a device is commissioned, or at other times, the mobile device may send a message to the device using light, such as the flashlight available on certain mobile devices. In some embodiments, the light may signal a message by flashing. In some embodiments, the message may be in Morse code, modified Morse code, or a different code.

While a target device has the action running that was triggered (and maybe continued) by the mobile device, an animated wait timer icon may indicate the progress of the action. When the mobile device must be positioned for a period of time, the wait time icon may indicate the portion of the time left for the action. FIG. 6 illustrates a collection 600 of animated wait icons 610, 620, 630 that may be used in embodiments described herein. As a first example, the original overlay 425 is shown with the percentage of the action that has been completed ("47%"). As a greater percent of the action is completed, overlay 425 is increasingly "filled" 615 as indicated by a different coloring of the overlay 425, and the percent is updated. Another pair of wait icons 620, 630 display the original overlay 425 along with an additional shape 625, 635 that matches the shape of the overlay 425, which is slowly created as the completion percentage increases. In this manner, the outline of the original overlay 425 may be gradually traced to show the degree of action completion. In some embodiments, the percentage completed is also shown. In some embodiments, the wait icon is shown outside the overlay; in some embodiments, the percentage completed is not shown, etc. The mobile device 420 may determine the percentage of completion of the action by any means including, for example, setting a timer based on the amount of time expected for action completion, polling the target device 410 for completion percentage, or estimating percentage completion based on the passage of certain milestones in the action performance.

FIG. 7 illustrates an example method 700 for selecting a device for a commissioning action. The method 700 may be performed by a mobile device such as device 100, 230, or 300a-c and may correspond, for example, to the device selection instructions 164 or the process described with respect to FIGS. 3A-C.

The method 700 may begin in step 705 in response to, for example, the user opening a device commissioning app (e.g., a single app including the device selection instructions 164, position feedback instructions 166, and commissioning instructions 168) or otherwise indicating a desire to select a device for commissioning, for short range communication, or for another purpose. The method proceeds to step 710 where the device receives information about the environment and devices. For example, the device may receive at least a portion of a digital twin 270 from another device or from its own memory. In step 715, the device retrieves a subset of information about the environment and available devices from the information received in step 710. For example, where the method 700 has just started, the device may retrieve the highest level information about the environment (e.g., a list of floors in a building). It will be appreciated that, in some embodiments (e.g., where the environment and device information was already locally stored in the mobile device), the steps of receiving 710 and retrieving 715 may be performed as part of a single memory access and, as such, steps 710, 715 may be implemented as a single step.

In step 720, the mobile device displays the information retrieved for display. For example, the mobile device may display the subset of environment and device information. Such display may include one or more user-selectable elements such as buttons or other clickable or tappable areas representing requests for different views of the environment or devices (e.g., drilling down), a detail view of a device, or the performance of one or more commissioning actions. In step 725, them mobile device receives a user selection of one or more of such user-selectable elements and then begins the process of interpreting and serving the request.

In step 730, the mobile device determines whether the user selection received in step 725 was a request to drill down into the view of the environment or devices. For example, it may include the selection of a specific floor so that the floorpan and devices on that floor will be displayed in more detail. If so, the method 700 loops back to step 715, where the mobile device may select a different subset of information for display. The subset of information may be determined by or otherwise based on the specific selection from the user (e.g., floor one, floor two, heating subsystem, cooling subsystem, ventilation map, etc.). The method 700 may then proceed as previously described from there.

If, on the other hand, the mobile device determines in step 730 that the request received in step 725 is not a request to drill down, the method may proceed to step 735, where the mobile device determines if the request instead represents a device selection or a request for more detailed information about a specific device. If so, the method 735 may proceed to step 745 where them mobile device retrieves the specific details about that device (e.g., name, network location, real location) along with actions that may be performed (e.g., a list of all actions that can be performed, a list of actions that are scheduled to be performed, etc.). This retrieval 745 may include retrieval of the details from the information received in 710 or may include a request to read additional information from a digital twin or elsewhere. The method then loops back to step 720 to display this retrieved device details and actions. The method 700 then proceeds as previously described from there.

If the mobile device determines in step 735 that the user selection received in step 725 is not a device selection, the mobile device may determine by process of elimination that the user selection must be the selection of an action to be performed with respect to the previously-selected device, and the method 700 may proceed to step 750. It will be apparent that in various alternative embodiments, more than three possible user selection types may be possible. Appropriate modifications to the method 700 to support additional user interactions will be apparent. In step 750, the mobile device may initiate or perform the selected action. In some embodiments or for some actions, the mobile device may perform the full requested action at step 750. In other embodiments or for some actions, step 750 may initiate an additional method to be performed by the mobile device. For example, where performance of the action entails short range communication or proper positioning of the mobile device for other reasons, step 750 may trigger execution of the position feedback instructions 166. At step 755 the method ends.

Figure 8:
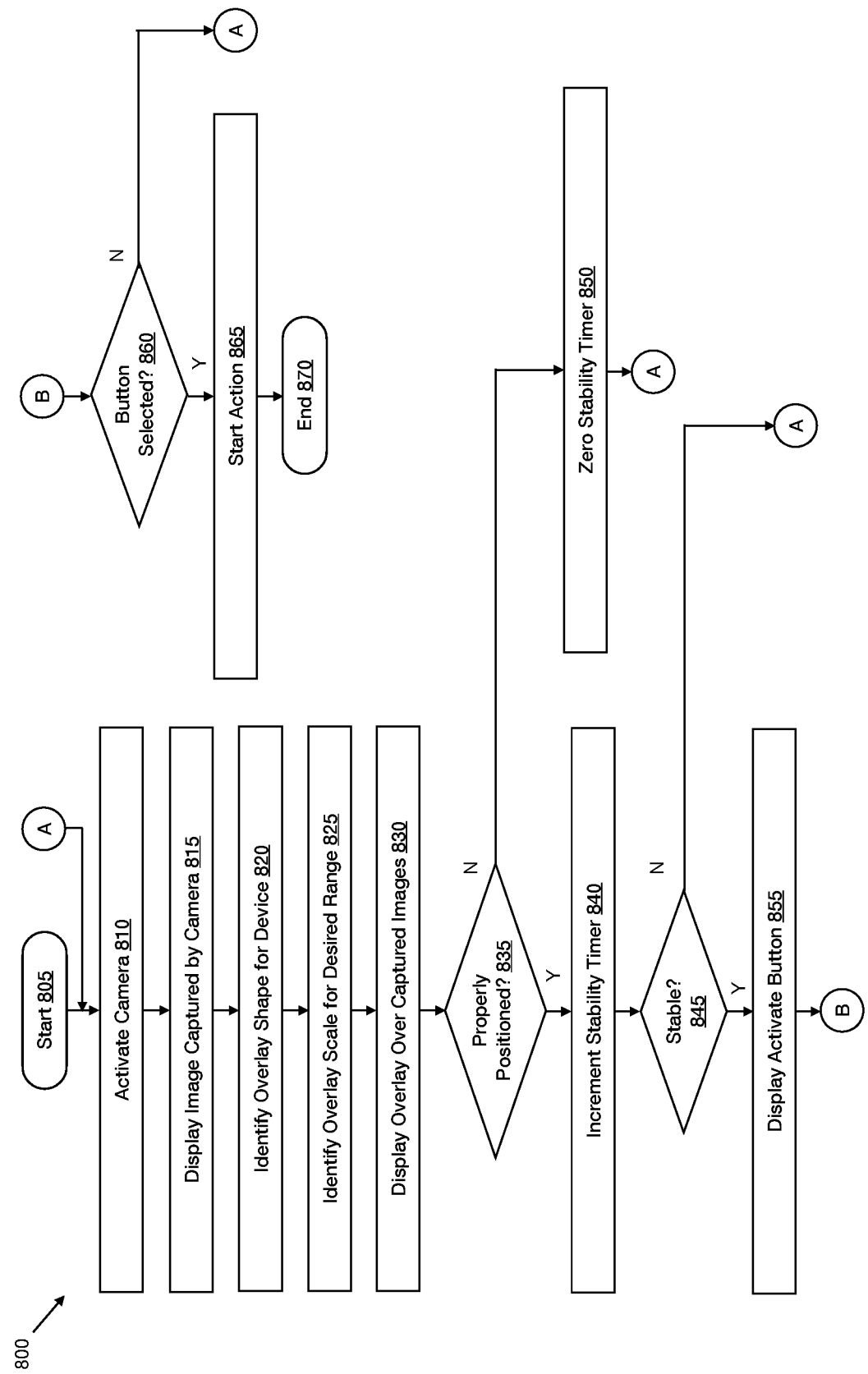
FIG. 8 illustrates an example method for providing positioning feedback to a user.

FIG. 8 illustrates an example method 800 for providing positioning feedback to a user. The method 800 may be performed by a mobile device such as device 100, 230, or 300a-c and may correspond, for example, to the positioning feedback instructions 166 or the process described with respect to FIGS. 4A-F.

The method 800 may begin in step 805 in response to, for example, the user indicating that an action should be performed for a target device or the mobile device determining that it needs to be positioned relative to a target device. In some embodiments, the method 800 may begin 805 in response to being triggered by step 750 of method 700. The method 800 proceeds to activate the mobile device camera in step 810 and display the image captured thereby in step 815. As will be shown, as an effect of the looping of the method 800, the mobile device may repeatedly capture 810 and display 815 images, creating a real time view on the display of the mobile device. In various alternative embodiments, the mobile device may be able to "set and forget" the camera and perform these steps 810, 815 only once in an initialization phase and nonetheless maintain such a live view. For example, the operating system 162 may provide functionality for activating and continually displaying such a live image.

In step 820, the mobile device identifies the appropriate shape for the overall. For example, the details describing the target device (e.g., as may have been retrieved in step 745 of method 700) may identify the appropriate shape. Such an arrangement may be useful in embodiments wherein different target devices include different shaped or sized indicia, such that a different overlay is appropriate under different circumstances. In other embodiments, the same shape or size indicia may be visible on all target devices, and step 820 may simply involve retrieving the sole overlay shape definition from memory.

In step 825, the mobile device identifies the appropriate scale for the overlay. For example, the details describing the target device (e.g., as may have been retrieved in step 745 of method 700) may identify the appropriate scale. Additionally or alternatively, the appropriate distance for proper positioning, the hardware and software specifics of the camera, and the known size of the indicia on the target device may be used to compute the appropriate scale of the overlay to adequately instruct the user to properly position the mobile device. Such embodiments may be useful when different target devices are associated with different size indicia or different desired ranges for short range communication. In other embodiments, these variables may instead be static and a single scale overlay may always be used. In such embodiments, step 825 may simply involve reading the appropriate scale factor from memory or, where the overlay image is already stored at appropriate scale, steps 820, 825 may be combined into a single step of retrieving the appropriate overlay image or other description from memory. Once the overlay has been identified, the method 800 proceeds to display the indicia over the live image in step 830, thereby providing a first visual feedback to the user.

In step 835, the mobile device may determine whether it is currently properly positioned with regard to the target device. Various methods may be used or combined to make such a determination. For example, the mobile device may perform image analysis to determine whether the overlay and the captured image of the target device indicia are sufficiently aligned or coinciding within some degree of tolerance. As another example, them mobile device may attempt a short range communication with the target device and, if a response is received with a sufficient signal-to-noise ratio or other characteristics indicating reliable communication, the mobile device may determine that it is properly positioned.

If the device isn't properly positioned, the method may zero any ongoing stability timer in step 850 (indicating any previous stability has been lost) and loop back to step 810, continuing to show the live image and overlay and thereby continuing to guide the user toward proper positioning. If, on the other hand, the device is properly positioned, the method 800 may proceed to step 840 and increment a timer or counter for determining whether the device has been stably positioned for a long enough time to begin the desired communication or other action. In step 845, the mobile device determines whether the timer indicates that the mobile device has been stably positioned for long enough to begin the action. For example, the mobile device may determine whether the timer exceeds some threshold. Various alternative methods for determining sufficient stability will be apparent. If the mobile device has not been stably positioned for long enough, the method 800 simply loops back to step 810 and will continued to do so until the stability time indicates that the mobile device has been stably positioned with respect to the target device for a long enough time. Alternatively, in some embodiments or for some types of actions, the mobile device may not wait for any minimum time of stability before determining that the action can be performed; in such embodiments, steps 840, 845, 850 may be omitted, and the method 400 may proceed from step 835 directly to step 855 or 865.

When the mobile device has been stably positioned for long enough, the method 800 proceeds from step 845 to display an activate button in step 855. Then in step 860, the mobile device determines whether a user has selected the button, indicating that the action is to be commenced. If not, the method 800 loops back to step 810 and will continue to display the button through concurrent executions of step 855 until it is selected in step 860 (or until another event causes flow of the method 800 to no longer execute step 855). In some embodiments or for some types of actions, the mobile device may not ask for a user to initiate the action and, instead, may automatically start the action when properly positioned or when stably positions for long enough. In such embodiments, steps 855, 860 may be omitted, and the method 800 may proceed directly from step 835 or 845 to step 865.

In step 865, the mobile device 865 may commence the action to be performed by, for example, beginning short range communication with the target device. Step 865 may involve triggering the execution of another method or set of instructions, such as the commissioning instructions 168. The method 800 then proceeds to end in step 870.

Figure 9:
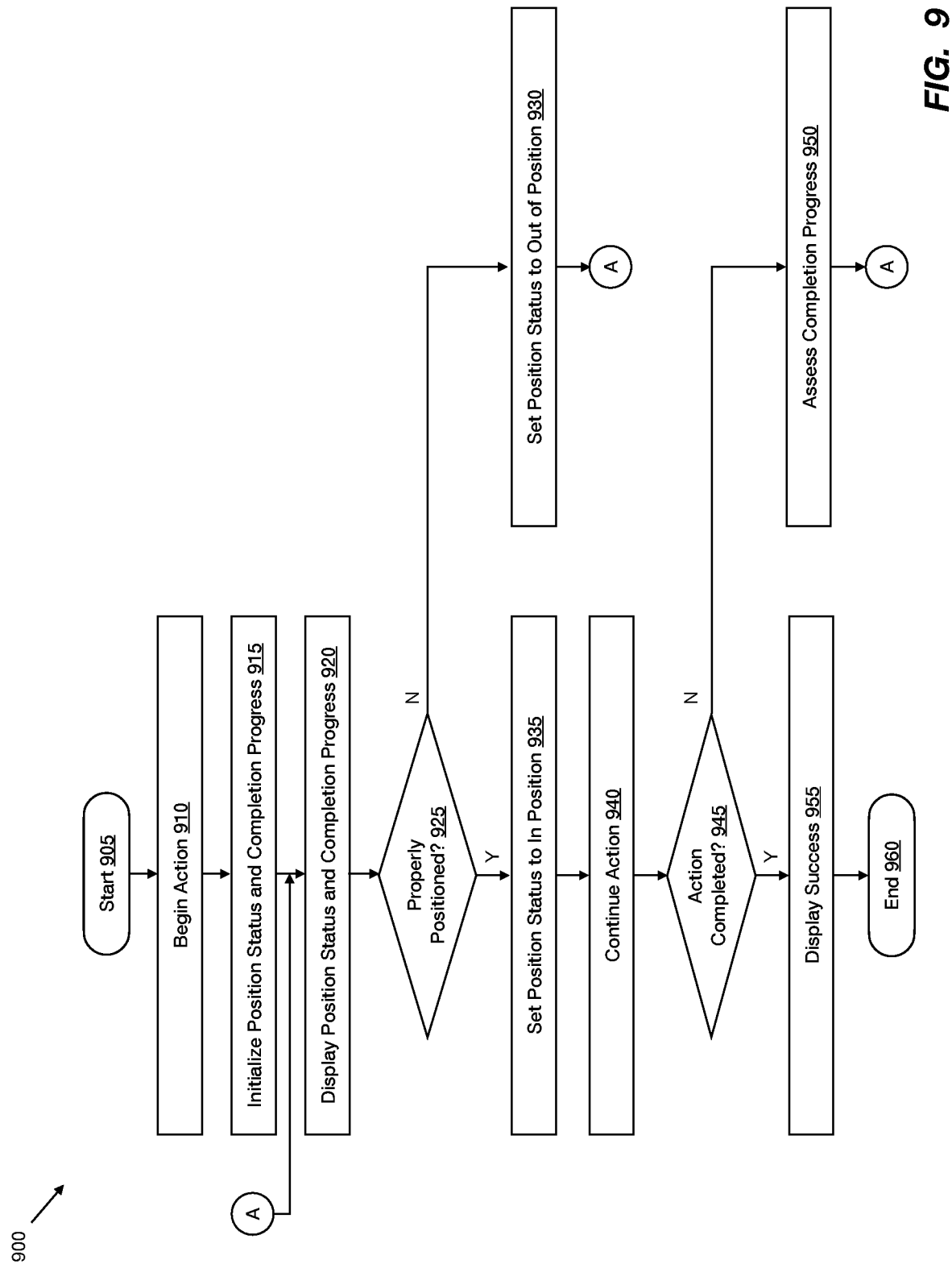
FIG. 9 illustrates an example method for performing an action while providing feedback to a user.

FIG. 9 illustrates an example method 900 for providing positioning feedback to a user while executing an action with respect to a target device, such as a commissioning action. The method 900 may be performed by a mobile device such as device 100, 230, or 300a-c and may correspond, for example, to the commissioning instructions 168 or the process described with respect to FIG. 6.

The method 900 may begin in step 905 in response to the mobile device determining that a commissioning action or other action is to be performed, e.g., upon achieving stable positioning with a target device or upon receiving a user indication that the action is to be commenced. In some embodiments, the method 900 may be initiated in response to step 865 of method 800 or, alternatively, may take the place of step 800 such that they form a single method or instruction set, and certain steps (as will be apparent) may be reused for both methods. At step 910, the mobile device may begin performing the desired action associated with the triggering event is begun. For example, the mobile device may, as a first step of completing the action, open a channel of communication with the target device by controlling the mobile device flashlight (or other communication interface) to send a ping, "hello," or other initiation message. Various approaches for defining a sequence of steps or communications to be performed to complete the desired action through multiple iterations of the method 900 (e.g., at steps 910, 940) will be apparent. For example, the action to be performed may be stored as a separate script through which the mobile device progresses through subsequent iterations of the method 900. The desired action (or subsets thereof) may require or otherwise benefit from the mobile device remaining within a given proximity to the target device. As will be shown in greater detail below, the method 900 will ensure that the proper positioning is maintained.

At step 915, the mobile device initializes two variables that will be used in displaying feedback to the user. A position status will be maintained to display whether or not the devices remain properly positioned for the action to progress. A completion progress will also be maintained to indicate to the user how close to complete the action is, particularly if the action takes some time to complete. At step 920, feedback is displayed on the mobile profile. The feedback may display both the position status (e.g., a "realign notice" if appropriate, as shown in FIG. 4E) and the completion progress (e.g., a modification to the overlay, as shown in FIG. 6). It will be apparent that various other forms of feedback may be shown as well. For example, the overlay may remain shown over a live image captured by the mobile device camera, as previously described in connection with steps 810-830 of method 800.

At step 925, the mobile device may determine whether the target device and the mobile device remain positioned correctly. This step 925 may occur at known intervals, or some other method of determining time intervals, or simply as the step is reached in the natural looping flow of method 900. Further, any of the previously-described methods with respect to step 835 of method 800 may be employed in this step 925. If the target device and the mobile device are no longer positioned correctly during the action, the method 900 proceeds to step 930, where the position status is updated to "out of position. The method 900 then loops back to step 920, where the updated position status is provided as feedback to the user (along with any other appropriate feedback).

If, on the other hand, the target device and the mobile device remain positioned correctly (or have reestablished proper positioning or stable positioning), then the method 900 proceeds to step 935, where the position status is set to "in position" for use in future executions of step 920. Then, in step 940, the mobile device continues with the next step of the desired action. For example, the mobile device may read the next executable portion of a script defining the desired action and perform it by, e.g., reading and assessing a response from another device (e.g., the target device), performing a computation, accessing local or remote data, or sending a message to another device (e.g., the target device). In some embodiments, the script may indicate multiple actions that may be performed together in a single execution of step 940 before the method 900 should proceed and thereby update the feedback in another execution of step 920. In other such embodiments, the method 900 may itself break up the script into such chunks, e.g., whenever the script calls for a step that requires proper positioning such as communication with the target device.

Once the mobile device has finished performing the substeps of the desired action for this iteration of the method 900, it proceeds to step 935, where the mobile device determines if the action is finished. For example, the mobile device may determine whether it has completed execution of a script defining the desired action or if the target device has sent back a message indicating that the action is complete. If not, the method proceeds to step 950, where the mobile device assesses and updates the completion progress. Various methods for performing this step 950 will be apparent. For example, the mobile device may assess what percentage of the substeps in the script have been completed, the script itself may note specific completion values at particular points in execution, or the target device may provide back its own measure of completion. The method 900 then loops back to step 920 to display the updated completion feedback (along with any other appropriate feedback)

If on the other hand, the mobile device determines in step 945 that the action has been completed, the mobile device proceeds to indicate successful completion of the action in step 955 and the method 900 proceeds to end in step 960. In some embodiments, the ending of the method 900 may then trigger other instructions or methods to begin executing on the mobile device. For example, the mobile device may return to executing method 700 (possibly having maintained previous state information regarding drill down depth) to enable the user to select another device for commissioning.

It should be apparent from the foregoing description that various example embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a mobile device, a tablet, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain example aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the scope of the claims.

The invention claimed is:

1. A method comprising:
displaying, on a screen of a mobile device having a camera, a real-time image from the camera;
displaying, on the screen, feedback indicating positioning of a second device captured in the real-time image;
determining that the positioning of the mobile device relative to the second device is sufficient to trigger an action on the second device; and
triggering the action on the second device using the mobile device;
wherein the feedback comprises a real-time view of a second shape on the second device superimposed over an overlay of a first shape on the screen.

2. The method of claim 1, further comprising during performance of the action, continuing to display feedback of the second device based on the real-time image.

3. The method of claim 1, further comprising, during performance of the action, indicating on the screen a visual demonstration of the action.

4. The method of claim 3, wherein the determining that the positioning of the mobile device is sufficient to trigger an action on the second device further comprises determining when an understandable response to the second device by the mobile device can be achieved.

5. The method of claim 4, wherein the understandable response comprises a predefined pinging response strength, a predefined signal to noise ratio strength, or a predefined image exactness measure.

6. The method of claim 5, wherein the predefined image exactness measure comprises a determined difference between the real-time image of an outer perimeter of a second shape on the second device and an overlay of the second shape on the screen of the mobile device.

7. The method of claim 6, wherein the visual demonstration of the action comprises filling in the overlay of the second shape.

8. The method of claim 7, wherein filling in the overlay of the second shape further comprises filling in a percent of the action that has been completed.

9. The method of claim 1, wherein indicating further comprises displaying a wait cursor.

10. The method of claim 1, wherein the action is a commissioning action.

11. The method of claim 10, wherein the commissioning action comprises a light source on the mobile device sending an encoded message to the second device.

12. The method of claim 1, wherein the first shape is a scaled version of the second shape.

13. A mobile device comprising:
a camera;
a memory; and
a processor configured to:
  display, on a screen of a mobile device having a camera, a real-time image from the camera,
  display on the screen, feedback indicating positioning of a second device captured in the real-time image,
  determine that the positioning of the mobile device relative to the second device is sufficient to trigger an action on the second device, and
  responsive to determining that the positioning is sufficient to trigger an action on the second device, trigger the action on the second device using a signal from the mobile device;
wherein positioning being sufficient to trigger an action comprises a real-time view of a second shape on the second device superimposed over an overlay of a first shape on the screen.

14. The mobile device of claim 13, wherein feedback indicating positioning of a second device captured in the real-time image comprises an indication to a user that the action can begin.

15. The mobile device of claim 14, wherein the processor is further configured to trigger the action on the second device using the mobile device when the user indicates the action should begin using a user interface on the mobile device.

16. The mobile device of claim 15, wherein the signal from the mobile device is a sound signal, a radio signal, a LiDAR signal, or a light signal.

17. The mobile device of claim 16, wherein the signal from the mobile device comprises an encoded signal.

18. The mobile device of claim 17, wherein the encoded signal comprises a modified Morse code signal.

19. A non-transitory machine-readable medium encoded with instructions for execution by a processor for causing a device to trigger an action on a second device, the non-transitory machine-readable medium comprising:
- instructions for displaying, on a screen of a mobile device having a camera, a real-time image from the camera;
- instructions for displaying, on the screen, feedback indicating positioning of a second device captured in the real-time image;
- instructions for determining that the positioning of the mobile device relative to the second device is sufficient to trigger an action on the second device; and
- instructions for triggering the action on the second device using the mobile device;
- wherein the feedback comprises a real-time view of a second shape on the second device superimposed over an overlay of a first shape on the screen.

20. The non-transitory machine-readable medium of claim 19, further comprising, during performance of the action, instructions for indicating on the screen a visual demonstration of the action.

* * * * *